US006112707A

United States Patent [19]

Kirk

[11] Patent Number: 6,112,707

[45] Date of Patent: Sep. 5, 2000

[54] ENGINE FUEL SYSTEM WITH A SUPER CHARGED AIR COMPRESSOR

[75] Inventor: J. David Kirk, Fond du Lac, Wis.

[73] Assignee: Brunswick Corporation, Lake Forest, Ill.

[21] Appl. No.: 09/349,671

[22] Filed: Jul. 8, 1999

[51] Int. Cl.[7] .......... F16K 7/17

[52] U.S. Cl. .......... 123/65 BA; 123/572

[58] Field of Search .......... 123/73 A, 73 V, 123/65 B, 65 BA, 572

[56] References Cited

U.S. PATENT DOCUMENTS 5,456,239 10/1995 Henderson et al. .
5,878,703 3/1999 Sweeney .......... 123/65 BA

*Primary Examiner*—Marguerite McMahon
*Attorney, Agent, or Firm*—William D. Lanyi

[57] ABSTRACT

An internal combustion engine is provided with an air compressor that receives precharged air from the crankcase of the engine. By providing pressurized air to the air compressor, the mass flow through the compressor can be increased without requiring an increase in the size of the compressor. The plurality of crankcase chambers of the engine can be connected to a common manifold chamber which, in turn, can be connected to the air inlet of the compressor. The air outlet of the compressor can be connected to a plenum chamber that is, in turn, connected to all of the fuel injectors of a fuel injected engine. Alternatively, the air outlet of the compressor can be used to provide pressurized air to other portions of the engine, whether it is fuel injected or carbureted.

18 Claims, 2 Drawing Sheets

ENGINE FUEL SYSTEM WITH A SUPER CHARGED AIR COMPRESSOR

BACKGROUND OF THE INVENTION

1. Field of the Invention

The present invention is generally related to a fuel system for an internal combustion engine and, more particularly, to a fuel system that incorporates an air compressor that has an air inlet connected to a discharge port of a crank case of the engine to provide a charge of pressurized air at the air inlet of the compressor.

2. Description of the Prior Art

Many different types of internal combustion engine fuel system are known to those skilled in the art. When the internal combustion engine is provided with a direct fuel injection system (DFI), it is well known to provide an air compressor for the purpose of providing pressurized air that is used during the fuel injection procedure.

U.S. Pat. No. 5,456,239, which issued to Henderson on Oct. 10, 1995, describes a crankcase ventilation system for a vehicle which includes an arrangement of flow conduits and control valves which cooperate with a two-chamber accumulator and with various vehicle components to route crankcase gases to the intake manifold. The primary vehicle components include a compressor, an after cooling positioned downstream from the compressor, and an engine having an intake manifold and a crankcase. One chamber of the accumulator is coupled by one conduit to the inlet side of the compressor and by a second conduit to the outlet side of the compressor. These two conduits are controlled by a duel valve arrangement. The other chamber of the accumulator is connected by one conduit to the crankcase and by a separate conduit to the intake manifold. Each conduit includes a control valve. The system operates on pressure differences existing between these various components. The cycle begins by opening the conduit which is connected to the inlet side of the compressor. This creates a low pressure on that side of the diaphragm. Due to their higher pressure, s the crankcase gases empty into the accumulator and when a predetermined pressure is reached, the various valves change state, allowing the higher pressure side of the compressor to empty into the accumulator. This pushes the lower pressure crankcase gases out of the accumulator through a different conduit to the intake manifold. These crankcase gases are then burned in the cylinder and the crankcase gases are not vented directly to the atmosphere.

Air compressors have been used to provide high pressure air to the intake manifold of an internal combustion engine in order to provide a flow of pressurized air into the combustion chambers of the engine. Various types of fuel injected engines use compressors to provide high pressure air which is then controlled by the injectors to cause the high pressure air to flow into the combustion chambers along with a predetermined quantity of fuel. Certain carbureted engines also use pressurized air to provide turbocharging. In typical applications, the air compressor receives an inflow of air from the ambient surroundings. If it is necessary to provide the cylinders of the engine with a higher rate of air flow into the combustion chambers, a typical solution is to use a compressor with a higher volumetric capacity. This, in turn, requires a larger compressor. In many applications, space is at a high premium. For example, internal combustion engines that are used in outboard motor applications have limited space under the cowl. The requirement of a larger compressor is difficult to satisfy because of consideration of space under the cowl.

It would therefore be significantly beneficial if a means could be provided to increase the rate of air flow through a compressor to the combustion chambers of the engine without requiring a larger compressor.

SUMMARY OF THE INVENTION

An internal combustion engine made in accordance with the present invention comprises a first cylinder formed in a block of an engine and a first piston connected to a crankshaft of the engine by a first connecting rod. The first piston is disposed for reciprocal movement within the first cylinder between a first combustion chamber of the first cylinder and a first crankcase chamber of the engine. The pressure within the first crankcase chamber changes in magnitude in response to the reciprocal of the movement of the first piston. A compressor is provided with an air inlet and an air outlet. The air outlet is connected in intermittent fluid communication with the combustion chamber to provide pressurized air into the combustion chamber. A first conduit is provided and connected in fluid communication between the air inlet of the compressor and the first crankcase chamber in order to provide air to the air inlet of the compressor as the piston moves toward the first crankcase chamber.

In a more typical application of the present invention, first and second cylinders are formed in the engine. The first and second pistons are connected to a crankshaft of the engine by first and second connecting rods, respectively. The pistons are disposed for reciprocal movement in their associated cylinder between combustion chambers of their associated cylinders and crankcase chambers of the engine. The pressure within each of the first and second crankcase chambers changes in magnitude in response to the reciprocal movement of the associated piston.

A plenum chamber is connected in fluid communication between the air outlet of the compressor and the combustion chambers. This is referred to as a air rail and the plenum chamber operates as a manifold or central pressurized chamber from which each of the fuel injectors receives pressurized air. The present invention further comprises a manifold chamber connected in fluid communication with the crankcase chambers. The manifold chamber is connected in fluid communication with the air inlet of the compressor in order to provide air to the air inlet of the compressor from all of the crankcase chambers.

In a particularly preferred embodiment of the present invention, a first valve permits air to flow from the first crankcase chamber towards the manifold chamber and prevents air from flowing from the manifold chamber towards the first crankcase chamber. In addition, a second valve permits air from the second crankcase chamber toward the manifold chamber but prevents air from flowing in the reverse direction. An oil trap can be connected in fluid communication between the manifold chamber and the air inlet of the compressor.

A pressure regulator is connected in fluid communication with the exhaust port of the plenum chamber so that a preselected pressure can be maintained within the plenum chamber.

In certain embodiments, the compressor can be driven by its connection in torque transmitting relationship with the crankshaft of the engine, but this direct connection is not necessary in all embodiments of the present invention.

The engine can be fuel injected, wherein the compressor provides pressurized air for the fuel injectors. Alternatively, the engine can be carbureted wherein the compressor provides pressurized air to the intake manifold of the engine. By using pressurized air from the crankcase chambers of the engine, the air inlet of the air compressor can be precharged so that a greater quantity of air can be compressed by the air compressor and provided to the cylinders of the engine.

BRIEF DESCRIPTION OF THE DRAWINGS

The present invention will be more fully and completely understood from a reading of the description of the preferred embodiment in conjunction with the drawings, in which.

DESCRIPTION OF THE PREFERRED EMBODIMENT

Figure 1:
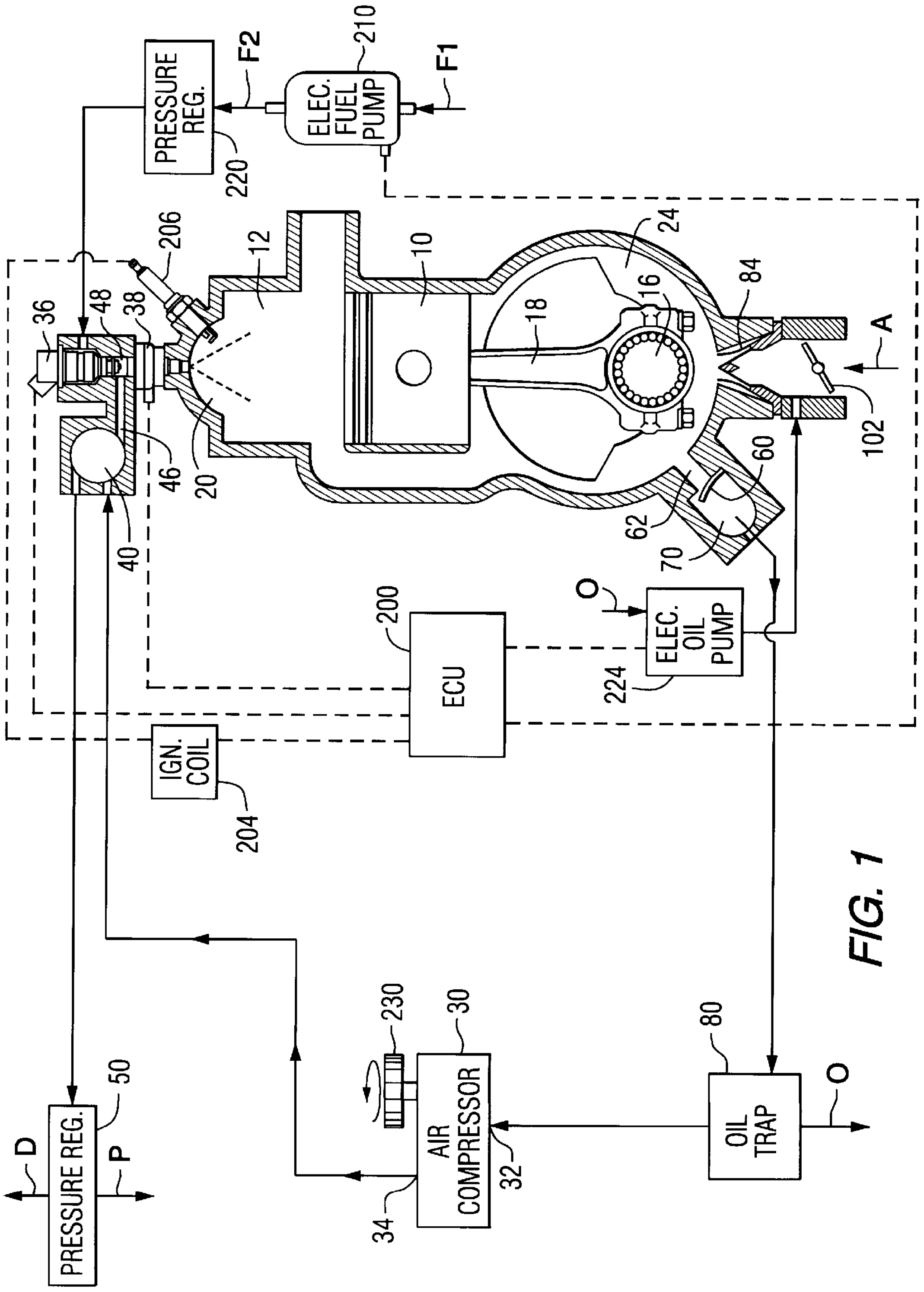
FIG. 1 is a schematic of the present invention and a single piston/cylinder combination of a multi-piston engine.

Throughout the description of the preferred embodiment, like components will be identified by like reference numerals.

FIG. 1 shows an arrangement in which the present invention is used to provide pressurized air to the cylinders of an internal combustion engine. In the arrangement of FIG. 1, a first piston 10 is disposed within a first cylinder 12 for reciprocal movement therein. The first piston 10 is connected to a crankshaft 16 by a connecting rod 18. As the crankshaft 16 rotates, the first piston 10 moves in a reciprocal manner between a first combustion chamber 20 of the first cylinder 12 and a first crankcase chamber 24. As the first piston 10 moves up and down in FIG. 1, the pressure within the first crankcase chamber 24 changes in response to the changing effective volume of the first crankcase chamber 24 in response to the moving first piston 10.

An air compressor 30 has an air inlet 32 and an air outlet 34. The air outlet 34 is connected in intermittent fluid communication with the combustion chamber 20. The system shown in FIG. 1 is a direct fuel injection system that incorporates a fuel injector 36 that operates in conjunction with an air injector 38. Pressurized air is conducted into a plenum chamber 40. The plenum chamber 40, sometimes referred to as an air rail, is connected in fluid communication with a plurality of fuel injectors. It should be understood that, although only one piston and cylinder are shown in FIG. 1, typical applications of the present invention would be associated with a plurality of pistons and cylinders. The other pistons and cylinders of the engine would be located behind the first piston 10, first cylinder 12, and first crankcase chamber 24 in FIG. 1. A common crankshaft 16 would cause a plurality of connecting rods to move their associated pistons within their associated cylinders. The plenum chamber 40 is connected in fluid communication with a plurality of fuel injectors 36 and air injectors 38. Either one air rail 40 can be used for all fuel injectors or, in certain circumstances, a pair of fuel rails can be used to provide all of the cylinders with pressurized air. For example, in a V-6 application, two fuel rails would be used, with each fuel rail providing pressurized air to three cylinders. A conduit 46 provides fluid communication between the plenum chamber 40 and an internal cavity 48 of the fuel injector structure. In that cavity 48, pressurized fuel is injected by the fuel injector 36 into the pressurized air chamber to await the air injector 38 which opens to allow the pressurized mixture to flow into the combustion chamber 20. The plenum chamber 40 is also connected in fluid communication with a pressure regulator 50 which can provide pressurized air to certain peripheral components, as represented by arrow P, and dump the remaining air, as represented by arrow D. As a result of the pressure regulator, the pressurized air within the plenum chamber 40 is maintained at a preselected magnitude, such as 80 PSI in many systems.

With continued reference to FIG. 1, a first valve 60 blocks a first conduit 62 that would otherwise connect the first crankcase chamber 24 in fluid communication with the air inlet 32 of the air compressor 30. In the arrangement shown in FIG. 1, a manifold chamber 70 is used to connect several conduits 62 in fluid communication with the common manifold chamber 70. In other words, the crankcase chambers for a plurality of pistons and their associated crankcases would all be connected in fluid communication with the manifold chamber 70. The valve 60 prevents the flow of pressurized air from the manifold chamber 70 into the crankcase chamber 24, but allows the flow of pressurized air from the crankcase chamber 24 into the manifold chamber 70. As will be described in more detail below, the pressure within the first crankcase chamber 24 fluctuates in response to the reciprocal movement of the piston 10 within the cylinder 12. As the pressure in the first crankcase chamber 24 fluctuates, it will change from a magnitude greater than the pressure in the manifold chamber to a pressure lesser than the pressure in the manifold chamber 70. The valve 60 allows flow from the crankcase chamber 24 to the manifold chamber 70, but inhibits flow in the reverse direction. As a result of several crankcase chambers all being connected in fluid communication with the manifold chamber 70, as illustrated in association with the first crankcase chamber 24, the pressure within the manifold chamber 70 is maintained near the maximum pressure reached within any one of the several generally identical crankcase chambers. This is caused by the fact that pressurized air flows from the crankcase chambers into the manifold chambers 70 only when the individual pressures within those crankcase chambers are greater than the pressure within the manifold chamber 70.

An oil trap 80 is provided to remove oil, as represented by arrow 0 in FIG. 1, from the air received from the manifold chamber 70. The air from the manifold chamber 70 passes through the oil trap 80 on its way to the air inlet 32 of the air compressor 30. When the pressure within the crankcase chamber 24 falls to a magnitude less than the pressure in the manifold chamber 70, air is drawn into the crankcase chamber 24 through the reed valve structure 84, as represented by arrow A in FIG. 1.

It should be recognized that known fuel injection systems typically allow ambient air to flow into the air inlet 32 of the compressor 30. All of the air that is compressed by the compressor 30 and provided to the plenum chamber 40 is received from the ambient atmosphere surrounding the air compressor 30. In a system made in accordance with the present invention, the air inlet 32 is provided with pressurized air from the manifold chamber 70 which is at a pressure magnitude slightly less than the maximum pressure achieved within each of the crankcase chambers 24 associated with the first piston 10 and the other crankcase chambers associated with other pistons of the engine. This allows the compressor 30 to be precharged at its air inlet 32 and, as a result, the pressurized air flowing from its air outlet 34 to the plenum chamber 40 has an increased density. As a result, the total mass of air flow provided to the plenum chamber 40 is significantly increased.

Figure 2:
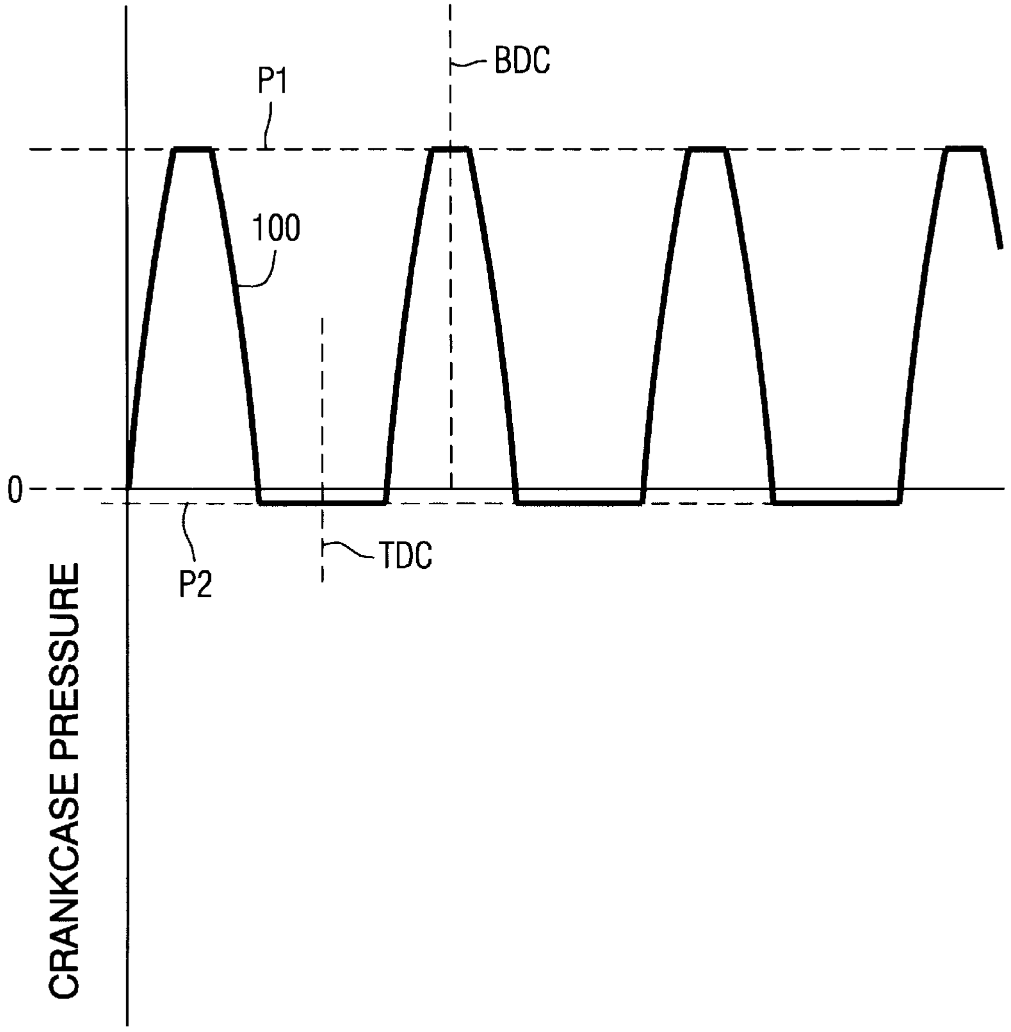
FIG. 2 is a graphical representation of the pressure variations within one crankcase chamber of an engine.

FIG. 2 is a graphical representation of the pressure magnitude within any one of the plurality of crankcase chambers during the operation of the engine. For example, the first crankcase chamber 24 shown in FIG. 1 has an internal pressure that is generally sinusoidal, but with truncations caused by the reed valve 84 and the valve 60. Line 100 in FIG. 2 shows the changing pressure within the first crankcase chamber 24 in response to the reciprocal movement of the first piston 10 within the first cylinder 12. As the first piston 10 moves upward toward the first combustion chamber 20, the pressure in the first crankcase chamber 24 is decreased because of the increasing volume of the first crankcase chamber 24 as a result of the upward movement of the first piston 10. This pressure decrease continues until the reed valve 84 opens to allow air A to enter the crankcase chamber. This pressure is represented by line T2 in FIG. 2 and is slightly less than the pressure at the intake manifold 102 shown in FIG. 1. As the piston 10 reaches top dead center (TDC) and reverses its motion, the pressure in the first crankcase chamber 24 begins to rise. The pressure increases within the first crankcase chamber 24 until valve 60 opens to allow air to flow from the first crankcase chamber 24 into the manifold chamber 70. This pressure, when valve 60 opens, is represented by dashed line P1 in FIG. 2. Valve 60 opens when the pressure within the first crankcase chamber 24 exceeds the pressure within the manifold chamber 70 by a sufficient amount to move the valve 60, which can be a reed valve in a preferred embodiment of the present invention. Air continues to flow from the first crankcase chamber 24 into the manifold chamber 70 as long as the crankcase pressure is above that of the manifold chamber. When the scavenge ports of the cylinder open, for the purposes of allowing scavenge air to flow from the crankcase chamber into the cylinder, the air pressure within the crankcase chamber will drop to a magnitude below that of the manifold chamber. The valve 60 will then close to maintain this pressure within the manifold chamber 70. The graphical representation in FIG. 2 is highly schematic and is intended for the purpose of describing the reciprocal movement of the piston 10 and its effect on the pressure within the first crankcase chamber 24. It should be understood that the graphical representation in FIG. 2 is theoretical and not empirical.

In operation, the pressurized air within the manifold chamber 70 is provided to the air inlet 32 of the air compressor 30 after the oil is removed by the oil trap 80. This provides an increased pressure and mass air flow ability at the air inlet 32. As a result, for each cycle of the compressor 30, more mass air flow is provided from the air outlet 34 to the plenum chamber 40. This increased mass air flow enhances the operation of the engine by providing more air to the fuel injectors and, eventually, to the combustion chambers. This increase in mass air flow is provided without the necessity of increasing the size of the air compressor 30.

Also shown in FIG. 1 is an engine control unit 200 which controls the fuel injector 36, the air injector 38, and ignition coil 204 that provides power to the spark plug 206. The engine control unit 200 also controls an electric fuel pump 210 that is provided with an inflow of fuel F1 and which provides an outflow of pressurized fuel F2 to a pressure regulator 220. The engine control unit 200 also controls the operation of an electric oil pump 224 that provides oil into the air stream A flowing through the reed valve 84.

The present invention can also utilize an air compressor 30 that has a gear 230 that can be connected in meshing relation with a gear attached to the crankshaft 16. Alternatively, the compressor 30 can be driven by a chain or toothed belt that is connected in torque transmitting relation with the crankshaft 16. Although this arrangement is not necessary in all embodiments of the present invention, it may be found to advantageous to time the peak pressure events in the crankcase chambers to the compressor inlet period by using a positive rotational drive system, such as the gear 230, a chain, or a toothed belt as described above. Although the present invention has been described with particular specificity, it should be understood that alternative embodiments are also within its scope.

I claim:

1. An internal combustion engine, comprising,:

a first cylinder formed in a block of said engine;

a first piston connected to a crank shaft of said engine by a first connecting rod and disposed for reciprocal movement within said first cylinder between a first combustion chamber of said first cylinder and a first crankcase chamber of said engine, a pressure within said first crankcase chamber changing in magnitude in response to said reciprocal movement of said first piston;

a compressor having an air inlet and an air outlet, said air outlet being connected in fluid communication with said combustion chamber to provide pressurized air into said combustion chamber;

a first conduit connected in fluid communication between said air inlet and said first crankcase chamber to provide air to said air inlet of said compressor as said piston moves toward said first crankcase chamber;

a second cylinder formed in a block of said engine;

a second piston connected to a crank shaft of said engine by a second connecting rod and disposed for reciprocal movement within said second cylinder between a second combustion chamber of said second cylinder and a second crankcase chamber of said engine, a pressure within said second crankcase chamber changing in magnitude in response to said reciprocal movement of said second piston; and a plenum chamber connected in fluid communication between said air outlet of said compressor and said first and second combustion chambers; and a manifold chamber connected in fluid communication with said first and second crankcase chambers, said manifold chamber being connected in fluid communication with said air inlet of said compressor to provide air to said air inlet of said compressor.

2. The engine of claim 1, further comprising:

a first valve which permits air to flow from said first crankcase chamber toward said manifold chamber and prevents air to flow from said manifold chamber toward said first crankcase chamber; and a second valve which permits air to flow from said second crankcase chamber toward said manifold chamber and prevents air to flow from said manifold chamber toward said second crankcase chamber.

3. The engine of claim 1, further comprising:

a pressure regulator connected in fluid communication with an exhaust port of said plenum chamber to maintain a preselected pressure within said plenum chamber.

4. The engine of claim 1, further comprising:

an oil trap connected in fluid communication between said manifold chamber and said air inlet of said compressor.

5. The engine of claim 1, wherein:

said compressor is connected in torque transmitting relation with said crank shaft.

6. The engine of claim 1, further comprising:

a fuel injector connected in intermittent fluid communication with said first combustion chamber and in fluid communication with said air outlet of said compressor.

7. The engine of claim 1, further comprising:

a fuel injector connected in intermittent fluid communication with said plenum chamber.

8. An internal combustion engine, comprising:

a first cylinder formed in a block of said engine;

a first piston connected to a crank shaft of said engine by a first connecting rod and disposed for reciprocal movement within said first cylinder between a first combustion chamber of said first cylinder and a first crankcase chamber of said engine, a pressure within said first crankcase chamber changing in magnitude in response to said reciprocal movement of said first piston;

a compressor having an air inlet and an air outlet, said air outlet being connected in fluid communication with said combustion chamber to provide pressurized air into said combustion chamber; and a second cylinder formed in a block of said engine;

a second piston connected to a crank shaft of said engine by a second connecting rod and disposed for reciprocal movement within said second cylinder between a second combustion chamber of said second cylinder and a second crankcase chamber of said engine, a pressure within said second crankcase chamber changing in magnitude in response to said reciprocal movement of said second piston;

a plenum chamber connected in fluid communication between said air outlet of said compressor and said first and second combustion chambers; and a manifold chamber connected in fluid communication with said first and second crankcase chambers, said manifold chamber being connected in fluid communication with said air inlet of said compressor to provide air to said air inlet of said compressor.

9. The engine of claim 8, further comprising:

a first valve which permits air to flow from said first crankcase chamber toward said manifold chamber and prevents air to flow from said manifold chamber toward said first crankcase chamber; and a second valve which permits air to flow from said second crankcase chamber toward said manifold chamber and prevents air to flow from said manifold chamber toward said second crankcase chamber.

10. The engine of claim 9, further comprising:

a pressure regulator connected in fluid communication with an exhaust port of said plenum chamber to maintain a preselected pressure within said plenum chamber.

11. The engine of claim 10, further comprising:

an oil trap connected in fluid communication between said manifold chamber and said air inlet of said compressor.

12. The engine of claim 8, wherein:

said compressor is connected in torque transmitting relation with said crank shaft.

13. The engine of claim 8, further comprising:

a fuel injector connected in intermittent fluid communication with said first combustion chamber and in fluid communication with said air outlet of said compressor.

14. The engine of claim 8, further comprising:

a fuel injector connected in intermittent fluid communication with said plenum chamber.

15. An internal combustion engine, comprising:

a first cylinder formed in a block of said engine;

a first piston connected to a crank shaft of said engine by a first connecting rod and disposed for reciprocal movement within said first cylinder between a first combustion chamber of said first cylinder and a first crankcase chamber of said engine, a pressure within said first crankcase chamber changing in magnitude in response to said reciprocal movement of said first piston;

a compressor having an air inlet and an air outlet, said air outlet being connected in intermittent fluid communication with said combustion chamber to provide pressurized air into said combustion chamber; and a second cylinder formed in a block of said engine;

a second piston connected to a crank shaft of said engine by a second connecting rod and disposed for reciprocal movement within said second cylinder between a second combustion chamber of said second cylinder and a second crankcase chamber of said engine, a pressure within said second crankcase chamber changing in magnitude in response to said reciprocal movement of said second piston;

a plenum chamber connected in fluid communication between said air outlet of said compressor and said first and second combustion chambers;

a manifold chamber connected in fluid communication with said first and second crankcase chambers, said manifold chamber being connected in fluid communication with said air inlet of said compressor to provide air to said air inlet of said compressor;

a first valve which permits air to flow from said first crankcase chamber toward said manifold chamber and prevents air to flow from said manifold chamber toward said first crankcase chamber;

a second valve which permits air to flow from said second crankcase chamber toward said manifold chamber and prevents air to flow from said manifold chamber toward said second crankcase chamber; and a pressure regulator connected in fluid communication with an exhaust port of said plenum chamber to maintain a preselected pressure within said plenum chamber.

16. The engine of claim 15, further comprising:

an oil trap connected in fluid communication between said manifold chamber and said air inlet of said compressor.

17. The engine of claim 15, wherein:

said compressor is connected in torque transmitting relation with said crank shaft.

18. The engine of claim 15, further comprising:

a fuel injector connected in fluid communication with said plenum chamber.

* * * * *